Nov. 1, 1966 G. R. COGAR 3,283,255

PHASE MODULATION SYSTEM FOR READING PARTICULAR INFORMATION

Filed July 5, 1962

INVENTOR
GEORGE R. COGAR

BY Edward M. Russell

ATTORNEY

United States Patent Office 3,283,255
Patented Nov. 1, 1966

3,283,255
PHASE MODULATION SYSTEM FOR READING PARTICULAR INFORMATION

George R. Cogar, Lancaster, Norwalk, Conn., assignor to Sperry Rand Corporation, New York, N.Y., a corporation of Delaware Filed July 5, 1962, Ser. No. 207,510
10 Claims. (Cl. 328—99)

This invention relates to a phase modulation system, and more particularly to a phase modulation system for reading binary information from a recording medium.

In many computer systems, binary information signals are recorded on a recording medium, such as a magnetic drum or tape. Such binary signals, having one of two different characteristics, may represent a "1" or a "0." A signal representing a "1," for example, may be represented by an alternating signal having a first form for the first half of its digit period and a second form for the second half of its digit period. Likewise, a "0" may be represented by a signal which is in the second form for its first half of its digit period and the first form for the second half of its digit period. Both types of signal may be considered as passing through zero in going from one level to another at the middle of their digit periods.

It is this so called zero crossing point which is utilized in many phase modulation systems to produce pulse signals representing a "1" or a "0." By detecting the direction in which the binary signal is going at the zero crossing point, the nature of the signal, i.e. whether it is a "1" or a "0," may be determined.

One of the chief advantages which may be derived from a phase modulation system which uses zero cross over points to determine the nature of the information signal is that recorded sprocket or clock signals are not necessary to recover the information signals. So called "self sprocketing" systems are therefore feasible in phase modulation systems. These are systems in which the information signals are used to generate the sprocket signals, which may also be referred to as timing signals.

In a phase modulation system of the type mentioned, the original signals recorded on the recording medium generally pass through various stages during a reading operation to convert the recorded information into pulses which represent either a "1" or a "0." In passing through these various stages, so called "non-significant" pulse signals are produced. Non-significant pulse signals may be produced whenever the pattern of signals include two consecutive similar type information signals, for example, two consecutive "0's" or two consecutive "1's." Under these conditions, the information signals pass through zero at points of time other than the middle of the digit periods, in addition to passing through at the middle of the digit periods. These points of time are generally the beginning of the digit periods.

Since only the zero cross over points at the middle of the digit periods are used to recover true information signals, other generated signals or pulses which have the same characteristic as information signals are considered non-significant or spurious signals and must be eliminated before the information may be applied to subsequent circuits.

In the past, circuit means have been employed to produce signals of a duration of three quarters of a digit period. These three quarter digit period signals were generally started by a true information pulse and used to inhibit the passage of spurious pulses to an output circuit.

In order to assure that the circuit means be triggered by a true information pulse, rather than a spurious pulse, it is necessary to provide a start-up pattern of signals which did not include any spurious signals. Such a pattern may be 1010. In some cases, it is desirable to provide a start up pattern of signals in which a series of signals of the same characteristics are used, for example 1111 or 0000.

It is an object of this invention to provide an improved read-out circuit in a phase modulation magnetic recording system.

It is a further object of this invention to provide an improved circuit for providing a start up pattern of signals of the same type.

In accordance with the present invention, a three quarter delay flop circuit for producing an inhibit signal is provided. Trigger signals representing significant zero crossings of a phase modulated signal are used to trigger the three quarter delay flop circuit. Means are provided to prevent signals representing the non-significant zero crossings from being applied to the delay flop circuit until it is properly synchronized.

Other objects and advantages of the present invention will be apparent and suggest themselves to those skilled in the art, from a reading of the following specification and claims, in conjunction with the accompanying drawing, in which:

Figure 1:
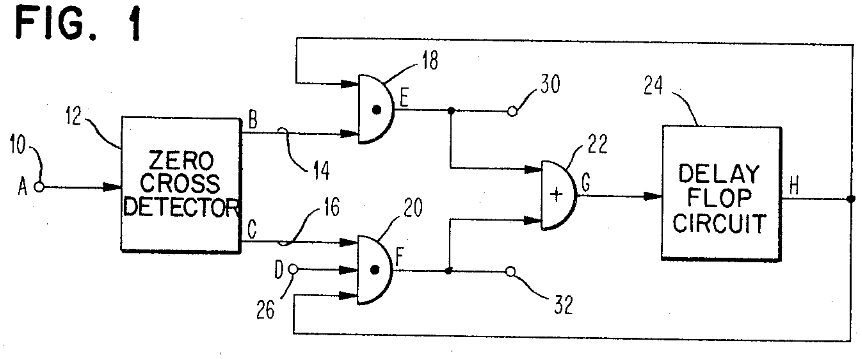
FIGURE 1 is a block diagram illustrating the present invention.
Figure 2:
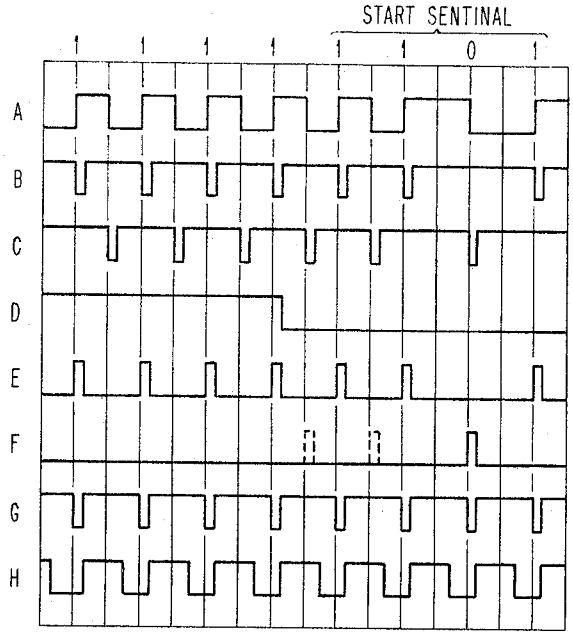
FIGURE 2 is a series of waveforms shown to illustrate the operation of the present invention.

Referring to FIGURES 1 and 2 of the drawing, a source of signals, represented by waveform 2A, is connected to an input terminal 10 and applied to a zero cross detector 12. The zero cross detector 12 produces a series of output signals, illustrated by waveform 2B, at the output line 14 and a series of signals represented by waveform 2C, at the output line 16.

The signals applied to the input terminal 10 may be from a Schmitt Trigger or other similar type circuit. The zero cross detector 12 may include a form of differentiating network which causes a pulse to be produced for each change in signal level.

The output signals from the lines 14 and 16 are applied to a pair of AND gate circuits 18 and 20, respectively. The output signals from the gate circuits 18 and 20 are applied to a third OR gate circuit 22. The output signals from the gate circuit 18 are represented by a waveform 2E. The output signals from the gate circuit 20 are represented by a waveform 2F. The output signals from the gate circuit 22 are represented by a waveform 2G.

The output signal from the gate circuit 22 is applied to trigger a delay flop circuit 24 to produce output inhibit signals represented by waveform 2H. The output signals from the delay flop circuit 24 are fed back to the gate circuits 18 and 20.

A second inhibit signal, represented by the waveform 2D, is also applied to the gate circuit 20 from an input terminal 26.

Referring to waveform A, it is noted that the first series information signals all have the same characteristic, in this case all "1's". Consequently, spurious or non-significant pulses, as well as information pulses, will be produced at the output lines 14 and 16. It is noted that the last four digits in waveform A is entitled "start sentinal." These last four signals are not related to the present invention and are merely used to indicate that the synchronizing period for the read out circuit is complete and that the reading of information may now proceed in the normal manner.

The zero cross detector 12 has output signals at the lines 14 and 16 which are normally positive. The line 14 may represent the "1" output and the line 16 may represent the "0" output. When a "1" crossing is detected, a negative pulse will be produced at the line 14.

When a "0" crossing is detected, the output at the line 16 causes a negative pulse to be produced.

The gate circuit 18 and 20 are inverting "negative AND gates." The gate circuit 22 is an inverting OR gate circuit. The delay flop circuit 24 is set by a positive going signal. The output voltage level at the delay flop circuit 24 is normally negative or low with respect to some point of reference potential. When the delay flop circuit 24 is set, its output voltage level becomes a long positive signal. The length or duration of the positive output signal from the delay flop 24 is used to block or inhibit the AND gate circuits 18 and 20 to prevent non-significant zero crossing pulse signals from passing therethrough from the lines 14 and 16, respectively. The output signals from the delay flop 24 is a signal period greater than one-half a digit period and less than the total digit period between significant pulses. The delay flop circuit is set on the triggering edge of the positive going signal, thus insuring that the output pulse width from the AND gates 18 and 20 are not affected by the delay flop circuit 24.

It is noted that the input signal to the terminal 26 is positive for a predetermined time dependent upon the length of the synchronizing time. After a predetermined time, the input signal to the terminal 26, represented by waveform 2D, becomes negative and may be considered to be absent as far as the subsequent operation of the gate circuit 20 is concerned.

After the synchronizing period is over, the circuit illustrated continues to function in the manner described. The output pulse signals from the lines 14 and 16 are also applied to output terminals 30 and 32, respectively. Only information pulse signals will be applied to these output terminals. All pulse signals, representing non-significant zero crossings, will be inhibited by the signal from the three quarter delay flop circuit 24.

Thus it is seen that the present invention provides a relatively simple means for providing a "start-up pattern" or series of synchronizing signals wherein the series of signals may all be of the same characteristic, i.e. all "1's" or all "0's".

The embodiments of the invention in which an exclusive property or privilege is claimed are defined as follows:

1. In combination with a system wherein information is converted into a series of pulse signals including equally spaced significant pulses representing information and non-significant pulses, the time between consecutive significant pulses being equal to one full signal period, a triggerable delay flop circuit for producing an inhibit signal adapted to be triggered by a pulse signal, said inhibit signal being of a duration more than one half and less than a full signal period, means for applying said series of pulse signals to said delay flop circuit, a first means for inhibiting said non-significant pulses for a predetermined time period whereby said delay flop circuit is triggered by the pulses representing said significant signals, and means for applying said inhibit signal from said flop circuit to inhibit said non-significant pulses.

2. In combination with a system wherein information is converted into a series of pulses signals including equally spaced significant pulses the time between consecutive significant pulses being equal to one full signal period, representing information and non-significant pulses, a triggerable delay flop circuit for producing an inhibit signal of three quarter signal period adapted to be triggered by a pulse signal, gating means for applying said series of pulse signals to said delay flop circuit, and means connected to said gating means for inhibiting said non-significant pulses for a predetermined time period whereby said delay flop circuit is triggered by said significant pulses.

3. In combination with a triggerable delay flop circuit for producing an inhibit signal adapted to be triggered by a pulse signal representing a significant zero crossing in a phase modulation system, a source of signals of the same characteristics, means for converting said signals to a series of pulses including significant and non-significant pulses, means for applying the significant pulses of said series of pulses to said delay flop circuit, means for inhibiting said non-significant pulses for a predetermined time period whereby said delay flop circuit is triggered by the significant pulses, and means for utilizing said inhibit signal from said delay flop circuit to inhibit said non-significant pulses.

4. In combination with a triggerable delay flop circuit for producing an inhibit signal of three quarter signal period adapted to be triggered by a pulse representing a significant zero crossing in a phase modulation system, the time between consecutive pulses representing significant zero crossings being equal to a full signal period, a source of signals of the same characteristic, means for converting said signals to a series of pulses including significant and non-significant pulses representing significant and non-significant zero crossings, respectively, means for applying the significant pulses of said series of pulses to said delay flop circuit, and means for inhibiting said non-significant pulses for a predetermined time period whereby said delay flop circuit is triggered by the pulses representing said significant zero crossings whereby said delay flop circuit is maintained in synchronization.

5. In combination with a triggerable delay flop circuit for producing a first inhibit signal adapted to be triggered by a pulse signal representing a significant zero crossing in a phase modulation system, means for generating pulse signals representing significant and non-significant zero crossings, means for applying a series of pulse signals representing significant zero crossings to said flop circuit, means for applying a second inhibit signal to inhibit non-significant pulses for a predetermined time period whereby said delay flop circuit is only triggered by the pulses representing said significant zero crossings, means for removing said second inhibit signal after said predetermined time period, and means for utilizing said first inhibit signal to inhibit said non-significant pulses.

6. In combination with a triggerable delay flop circuit for producing an inhibit signal of three quarter signal period adapted to be triggered by a pulse signal representing a significant zero crossing in a phase modulation system, means for generating pulse signals representing significant and non-significant zero crossings, means for applying a series of pulse signals representing significant zero crossings to said flop circuit, means for inhibiting said non-significant pulses for a predetermined time period whereby said delay flop circuit is triggered by the pulses representing said significant zero crossings, and means for utilizing said inhibit signal from said delay flop circuit to inhibit said non-significant pulses.

7. In combination with a system wherein information is converted into a series of pulse signals including equally spaced significant pulses representing information and non-significant pulses, the time between consecutive significant pulses being equal to one full signal period, a triggerable delay flop circuit for producing an inhibit signal of three quarter signal period adapted to be triggered by said series of pulses, a source of start up signals of the same characteristic for producing said series of pulse signals, means for applying said series of pulse signals representing significant pulse signals to said flop circuit, means for inhibiting said non-significant pulses for a predetermined time period whereby said delay flop circuit is triggered only by the pulses representing said significant zero crossings, and means for utilizing said inhibit signal from said delay flop circuit to inhibit said non-significant pulse signals whereby said delay flop circuit is maintained in synchronization after said start up signals of the same characteristic are terminated.

8. In combination with a system wherein information is converted into a series of pulse signals including equally spaced significant pulses representing information and non-significant pulses, the time between consecutive significant pulses being equal to one full signal period, a triggerable delay flop circuit for producing an inhibit signal of more than one half and less than a full signal period, said delay flop circuit being adapted to be triggered by the significant pulses of said series of pulses, a source of information signals of the same characteristic for producing said series of pulse signals, means for applying a series of pulse signals representing significant pulse signals to said flop circuit, gating means for inhibiting the passage of said non-significant pulses to said delay flop circuit for a predetermined time period whereby said delay flop circuit is triggered by the significant pulses and means for applying said inhibit signal from said delay flop circuit to said gating means to inhibit said non-significant pulses and to permit the passage of said significant pulses.

9. The invention as set forth in claim 8 wherein said gating means comprises first, second and third gate circuits.

10. The invention as set forth in claim 9 wherein means are provided to apply said significant pulse signals representing information to a utilization circuit.

References Cited by the Examiner

UNITED STATES PATENTS

| | | | |
|---|---|---|---|
| 2,769,086 | 10/1956 | Edwards | 328—99 |
| 2,824,228 | 2/1958 | Carmichael | 328—93 X |
| 2,986,649 | 5/1961 | Wray | 307—88.5 |
| 3,007,115 | 10/1961 | Batley | 328—93 X |
| 3,145,309 | 8/1964 | Bothwell et al. | 307—88.5 |
| 3,159,793 | 12/1964 | Welsh | 328—99 |
| 3,209,268 | 9/1965 | Fraunfelder et al. | 328—165 |

JOHN W. HUCKERT, *Primary Examiner.*

ARTHUR GAUSS, *Examiner.*

R. SANDLER, E. DREYFUS, *Assistant Examiner.*